Patented Mar. 6, 1923.

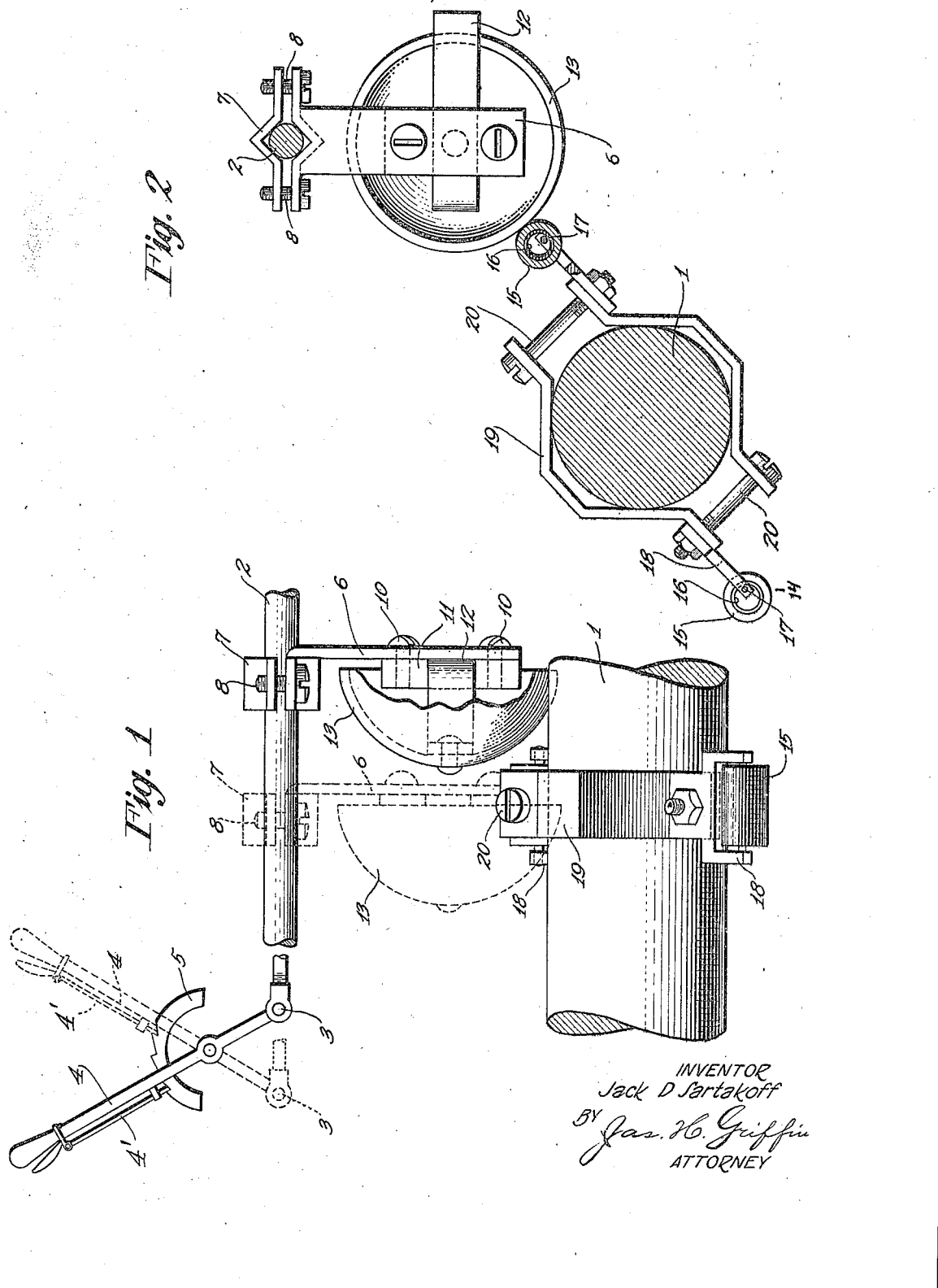

1,447,604

UNITED STATES PATENT OFFICE.

JACK D. SARTAKOFF, OF FORREST HILLS, NEW YORK.

EMERGENCY-BRAKE ALARM.

Application filed March 3, 1921. Serial No. 449,448.

*To all whom it may concern:*

Be it known that I, JACK D. SARTAKOFF, a citizen of Russia, residing at Forrest Hills, L. I., in the county of Queens and State of New York, have invented a certain new and useful Emergency-Brake Alarm, of which the following is a specification.

This invention is an emergency brake alarm intended for use on motor vehicles.

When a chauffeur or driver of a motor vehicle draws up to a curb and stops, he may accomplish this result either through the use of a foot brake or the emergency brake mechanism of the car depending usually upon the speed of the car at the time the stop is desired, as well as the load carried by the car and the grade or hill on which the stop is to be made. At times the foot brake may be used successfully, while at other times, the employment of the emergency brake is essential. Moreover, in some instances a driver will leave a car unbraked while at other times the car will be left with the emergency brake on. When a car is thus stopped or braked, it may be left standing for more or less time, while the driver leaves the car and carries on his business elsewhere. In any event, the driver upon returning to the car finds it the most natural procedure immediately upon becoming seated in the car to step on the starter and start the car without stopping to think whether the brakes are on or not. It thus often occurs that a car operator will start the car and sometimes travel for a considerable distance with the emergency brakes on. This places considerable strain on all operating parts of the car and are to be avoided under all circumstances.

The object of the present invention is to provide means whereby an alarm will be sounded in the event that a car operator endeavors to start his car while the brakes are on.

The invention broadly speaking contemplates connections between the car propelling means and the emergency brake mechanism, which connections are inoperative so long as the brakes are off, but are automatically brought into operative condition when the brakes are set so that any subsequent attempt to start the car while the brakes are on will result in the giving of an alarm. This alarm may be either of the audible or visual type, but is preferably the former.

Features of the invention, other than those specified, will be apparent from the hereinafter detailed description and claim, when read in conjunction with the accompanying drawings.

The accompanying drawings illustrate one practical embodiment of the invention, but the construction shown therein, is to be understood as illustrative, only, and not as defining the limits of the invention.

Figure 1 is a fragmental side elevation, with parts in section illustrating alarm mechanism associated with the main drive shaft of a motor vehicle and the brake rod of such vehicle; and, Figure 2 is a section on the line 2—2 of Figure 1.

While the alarm mechanism of the present invention may be either mechanical or electrical and may greatly differ in details of construction and mode of operation, a simple and practical form of the same is shown in the accompanying drawings, which form operates in an entirely mechanical manner.

Referring to the drawings, 1 designates the drive shaft of a motor vehicle, which, in practice, may constitute the main shaft leading from the transmission back to the differential, and 2 denotes a brake rod of the vehicle. In practice, the brake rod extends from the brake band forwardly and is pivotally secured as at 3 to the brake lever 4. When the brakes are off, the brake lever 4 is in the forward full line position of Figure 1 and to set the brakes, the handle of the lever 4 is grasped and pulled back to the dotted line position of Figure 1. This operation of the lever causes the rod 2 to be drawn forwardly and tightens the brake band with respect to the brake drum. A quadrant 5 is usually associated with the brake lever to assist in maintaining the brakes set, and, in practice, the lever may be locked at any position of its travel by engagement of a dog 4' with the quadrant, so that the brakes may be caused to grip with any degree of tightness desired by the driver. All of this mechanism is old and well known and forms no part of the present invention.

In associating the present invention with mechanism of the character described, a hanger 6 may be provided with a two part clamp 7, the parts of which may be clamped together by screws 8 in such manner as to firmly mount the hanger 6 upon the brake rod 2 after the manner shown in Figures 1 and 2. The re-entrant portions of the sections of the clamp are preferably angular, as shown, so that they are adapted to engage rods of different diameters. The hanger is pierced to receive two screws 10, which pass through the bracket and thread into a clamping block 11. The inner face of this block is cut out to permit of the passage therethrough of an arm 12. The arm 12 is off set at one end and a bell 13 is riveted in positioned by a rivet 14.

With this arrangement, it will be apparent that the bell will be rigidly mounted on the brake rod 2, but that the position of the bell with reference to the rod may be regulated by adjusting the arm in the clamping block 11. To accomplish this, the screws 10 are loosened and the arm 12 slid into desired adjustment, after which the screws are again tightened to bind the parts firmly in position. The bell, mounted as described, is supported on the brake rod, so that when the brake lever is shifted the bell will be moved longitudinally of the car and, in this manner, is adapted to be brought into and out of cooperative relation with bell actuating means mounted on the main shaft 1. This actuating means may conveniently consist in a bell striker 14 carried by the main shaft and operated thereby.

The striker is preferably in the form of a metallic tube 15 having a rubber bushing 16 formed by slipping a length of rubber tubing into the metallic tube. A pin 17 passes loosely through the striker and is secured at its opposite ends to the arms of a yoke 18 which straddles the striker as clearly shown in Figure 1. A clamp 19 of substantially the same character as the clamp 7, embraces the main shaft 1 and is firmly held in place by screws or bolts 20, one of which passes through the stem of the yoke 18 and serves to securely mount the striker on the main shaft.

In practice, the clamps 7 and 19 are mounted in such relative positions on brake rod and main shafts, respectively, that when the brakes are off, the main shaft will merely swing the striker around without bringing it into contact with the bell. The relation of the parts will then be as shown in full lines in Figure 1. The parts are, however, so assembled that when the brake lever is pulled back to set the brakes, the resulting forward movement of the brake rod will carry the bell into the path of operation of the striker, so that if the main shaft is now rotated, the bell will be struck and an alarm sounded.

It may be here noted that since the pin 17 passes loosely through the striker, the striker will be swung outwardly by centrifugal force when the shaft is rotated so that when it strikes the bell it is enabled to rebound without causing breakage or excessive strain on the parts. The rubber bushing of the striker not only cushions the shock occasioned by the striking of the bell but also renders the normal operations of the striker noiseless.

When the present invention, as described, is installed on a car, the setting of the brakes will automatically move the bell into a position to set the alarm and when the driver leaves the car with the brakes set, the alarm will be left in a condition to be automatically operated as soon as the car is subsequently started. If the driver attempts to start the car without releasing the brakes, the alarm will immediately be brought into operation and he will be reminded to release his brakes.

I am aware that the present invention may be carried out by entirely different mechanism than that described. In fact, any movable part of the vehicle operating mechanism may be utilized to give the alarm and any part of the brake mechanism may be employed to condition the alarm for operation either through mechanical or electrical means. If electrical means is employed, it is entirely feasible to have the brake mechanism operate to close a circuit to the automobile horn. For these reasons, the present invention is not restricted to the specific structure shown, but is to be understood as broadly novel as is commensurate with the appended claim.

Having thus fully described the invention, what I claim as new and desire to secure by Letters Patent is:

An emergency brake alarm attachment for motor vehicles embodying a clamp adapted to be rigidly secured to the drive shaft of a vehicle, a clapper carried by said clamp, a bracket, a bell supported on said bracket, and a clamp associated with the bracket for rigidly mounting the bracket on the hand brake rod of the vehicle in a position wherein the setting of the vehicle brake will automatically move the bell into the path of travel of the clapper.

In testimony whereof, I have signed my name to this specification.

JACK D. SARTAKOFF.